United States Patent [19]
Izumi

[11] Patent Number: 6,144,438
[45] Date of Patent: *Nov. 7, 2000

[54] LIQUID CRYSTAL DISPLAY DEVICE OF MULTI-PANEL TYPE AND METHOD FOR FABRICATING THE SAME

[75] Inventor: Yoshihiro Izumi, Kashihara, Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/721,739

[22] Filed: Sep. 27, 1996

[30] Foreign Application Priority Data

Oct. 11, 1995 [JP] Japan ................................. 7-262682

[51] Int. Cl.⁷ ................................................ G02F 1/1339
[52] U.S. Cl. ........................... 349/155; 349/153; 349/73; 349/190
[58] Field of Search .................................. 349/155, 153, 349/190, 73; 359/FOR 105

[56] References Cited

U.S. PATENT DOCUMENTS

| | | |
|---|---|---|
| 5,654,781 | 8/1997 | Izumi . |
| 5,729,317 | 3/1998 | Izumi . |
| 5,739,888 | 4/1998 | Ogura et al. ............................ 349/155 |
| 5,742,371 | 4/1998 | Izumi . |
| 5,754,267 | 5/1998 | Izumi . |
| 5,812,226 | 9/1998 | Izumi et al. . |
| 5,867,236 | 2/1999 | Babuka et al. ........................... 349/153 |
| 5,889,568 | 3/1999 | Seraphim et al. ....................... 349/149 |

FOREIGN PATENT DOCUMENTS

| | | | |
|---|---|---|---|
| 60-179722 | 9/1985 | Japan ..................................... 349/153 |
| 1-73323 | 3/1989 | Japan ..................................... 349/153 |
| 1-213621 | 8/1989 | Japan . |
| 3-293633 | 12/1991 | Japan ..................................... 349/153 |
| 4-153625 | 5/1992 | Japan ..................................... 349/153 |
| 5-127605 | 5/1993 | Japan . |
| 6-17178 | 5/1994 | Japan . |
| 6-160868 | 6/1994 | Japan ..................................... 349/155 |

*Primary Examiner*—James A. Dudeh
*Attorney, Agent, or Firm*—Nixon & Vanderhye, P.C.

[57] ABSTRACT

A liquid crystal display device of multi-panel type designed for achieving a large display by connecting a plurality of liquid crystal display panels to each other adjacently on a flat surface. The diameter of spacers contained in a seal placed on the joined side of each liquid crystal display panel and adjacent liquid crystal display panel is made greater than a diameter of spacers contained in a seal placed on other sides. Electrical wiring is formed on at least one of two pieces of substrates holding a liquid crystal therebetween so that the electrical wiring does not overlap the seal placed on the joined side. This structure enables the cell gap in the vicinity of the joined side of each liquid crystal display panel and adjacent liquid crystal display panel to be substantially equal to the cell gap on other sides, thereby providing a multi-panel type liquid crystal display device having high display quality.

8 Claims, 11 Drawing Sheets

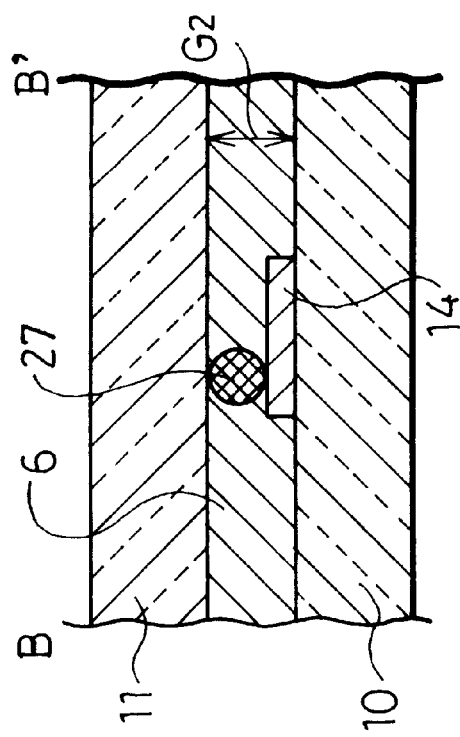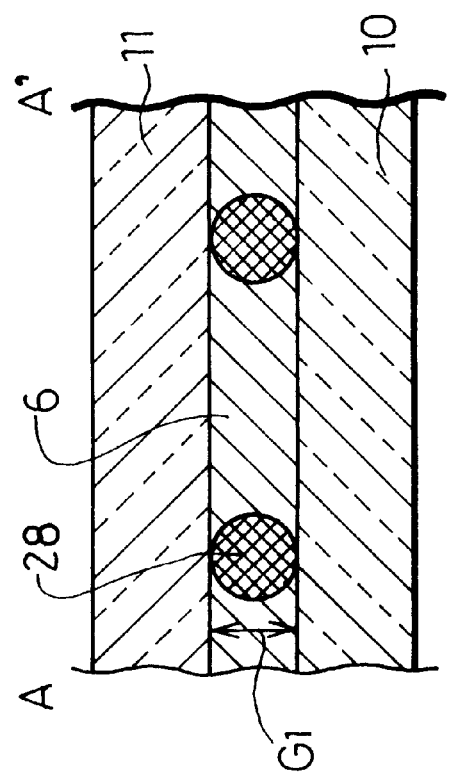

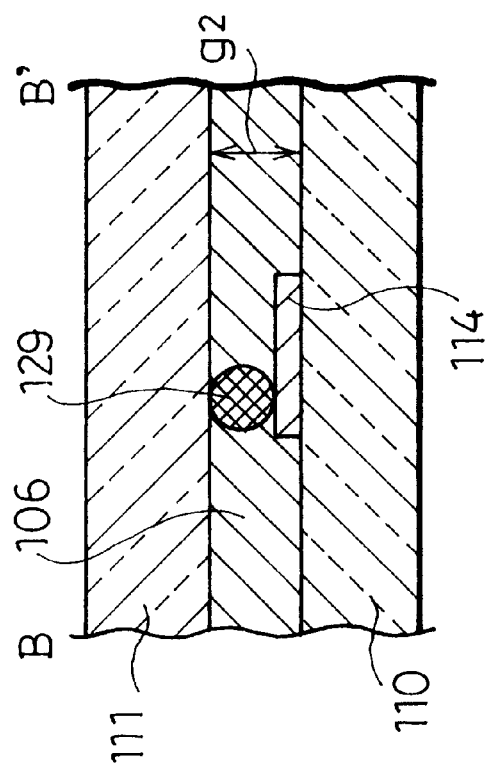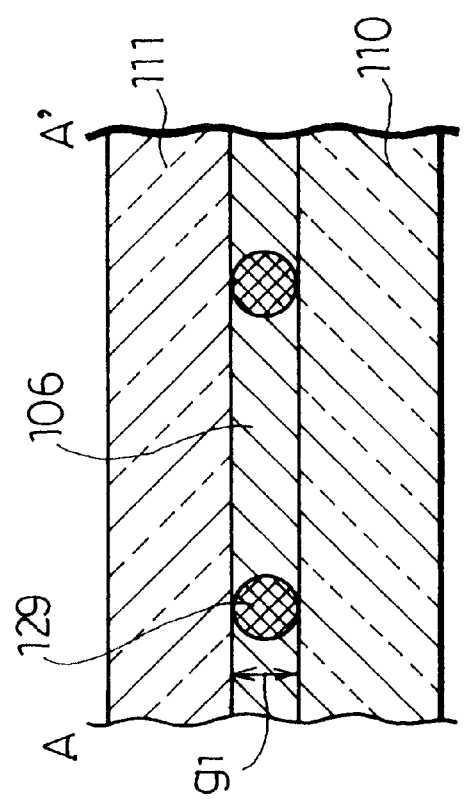

FIG. 9
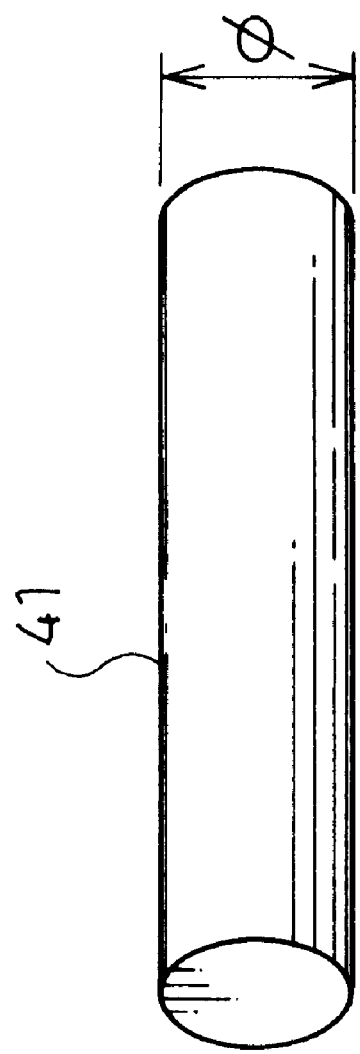
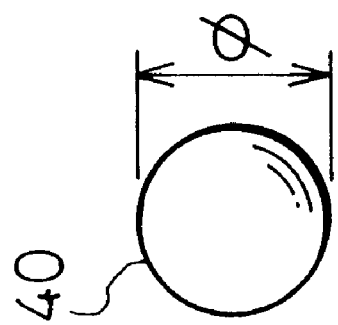

LIQUID CRYSTAL DISPLAY DEVICE OF MULTI-PANEL TYPE AND METHOD FOR FABRICATING THE SAME

FIELD OF THE INVENTION

The present invention relates to a liquid crystal display device for use in AV (audio visual) equipment and OA (office automation) equipment, and more particularly relates to a liquid crystal display device of multi-panel type fabricated by joining a plurality of liquid crystal display panels, and a method for fabricating the same.

BACKGROUND OF THE INVENTION

Currently, in the field of displays for use in AV equipment including a home-use television system and OA equipment such as personal computers, there is a growing demand for light-weight, thin, low power consuming, high-definition, and large displays. In order to meet the demand, development of display devices such as CRT, liquid crystal display device (LCD), plasma display device (PDP), EL (electroluminescent) display device and LED (light emitting diode) display device has been actively carried toward realizing large displays and practical applications.

In particular, liquid crystal display devices can realize an extremely small thickness (depth), less power consumption, and full-color display easily compared to other types of display devices. Therefore, the liquid crystal display devices have been used in various fields in resent years, and development of a large display is greatly expected.

However, if the screen size of the liquid crystal display device is increased, the fraction defective due to disconnection of signal lines, pixel defects and the like abruptly increases in the fabrication processes. As a result, the price of the liquid crystal display device increases.

In order to solve such a problem, a technique for realizing a large display is disclosed in Japanese Publication for Unexamined Patent Application Nos. 213621/1989 (Tokukaihei 1-213621) and 127605/1993 (Tokukaihei 5-127505), and Japanese Publication for Examined Utility Model Application No. 17178/1994 (Jitsukohei 6-17178). In the disclosed technique, a large display is realized by fabricating one liquid crystal display device by joining a plurality of liquid crystal display panels. This technique is generally called a multi-panel technique.

However, when the liquid crystal display device of multi-panel type is fabricated by simply joining liquid crystal display panels together, light from a backlight leaks through gaps produced in the joints of the liquid crystal display panels. Thus, the joints of the liquid crystal display panels are noticeable.

In order to produce a natural image on such a large display, a technique for rendering the joints in the display screen less noticeable is required. Then, a liquid crystal display device of multi-panel type having less noticeable joints was proposed. The following description will discuss this liquid crystal display device.

FIG. 10 is a cross section showing the structure of a conventional liquid crystal display device. FIG. 11 is a perspective depiction showing the structure of electrodes in the conventional liquid crystal display device. FIG. 12 is a plan view showing the state in which a plurality of liquid crystal display panels of the conventional liquid crystal display device are joined.

As illustrated in FIG. 10, the conventional liquid crystal display device is constructed by closely disposing two pieces of liquid crystal display panels 101 and 102 on a flat surface of a piece of a large transparent substrate 102. This liquid crystal display device is a direct-viewing liquid crystal display device incorporating a backlight (not shown) behind the liquid crystal display panels 101 and 102. The backlight and a driver for controlling image signals are omitted in FIG. 10.

Each of the liquid crystal display panels 101 and 102 is constructed by holding a liquid crystal layer 107 between a TFT substrate 110 made of a transparent insulating substrate and a counter substrate 111. Namely, the liquid crystal layer 107 is formed by placing the TFT substrate 110 and the counter substrate 111 to face each other, fastening them with seals 106, and sealing in a liquid crystal therebetween.

Thin film transistors 116 are arranged in a matrix form on the TFT substrate 110. The thin film transistor 116 is usually a field effect transistor using a semiconducting film, and controls the supply of an image signal to a pixel electrode 115. On the other hand, color filters 104 are arranged in a matrix form on the counter substrate 111. The color filters 104 are usually formed by R (red), G (green), B (blue) pixel regions. These pixel regions are separated from each other by a black matrix 105.

When connecting such liquid crystal display panels 101 and 102, it is necessary to fill a refractive index adjusting agent 119 in a joint (joined line) 118. The refractive index adjusting agent 119 prevents diffusion of light due to unevenness between the edges of the liquid crystal display panels 101 and 102 at the joint 118, and renders the joint 118 less noticeable.

The refractive index adjusting agent 109 is required to also function as an adhesive agent when fastening the large transparent substrate 103 and the liquid crystal display panels 101 and 102. It is therefore necessary to use a material having adhesive and sticky properties, for example, an ultraviolet-ray-setting resin used for fastening optical lenses.

Moreover, by placing polarizing plates 108 substantially over the entire front and back surfaces of a large panel which is formed by connecting the above-mentioned two pieces of liquid crystal display panels 101 and 102 with the refractive index adjusting agent 109 so that the polarization axes thereof cross each other at right angles, a liquid crystal display device of multi-panel type is fabricated.

In general, a direct-viewing liquid crystal display device includes a backlight such as a cold-cathode lamp. When a liquid crystal display panel placed in front of the backlight modulates light from the backlight according to image information, the image information input to the liquid crystal display panel is visualized.

At the intersections of the pattern of the seals 106 and the patterns of electrical wiring 113 and 114, the following phenomenon is usually observed. FIG. 13 is an enlarged plan view showing a structure in the vicinity of the seal 106.

The electrical wiring 113 and 114 is formed by patterning a metal film such as Ta, Cr and Al using a photolithography technique. Since the metal film is usually formed with a thickness between 2000 Å and 5000 Å, a corresponding gap is produced at the edge sections of the electrical wiring 113 and 114. In this case, as illustrated in FIG. 13, if the seal 106 is applied across the electrical wiring 114 (scanning electrode), the seal 106 gradually oozes out along a gap of 2000 Å to 5000 Å of the electrical wiring 114, and the linearity of the seal pattern is ruined.

Thereafter, when forming the liquid crystal display panels 101 and 102, regions having different cell gaps are produced in the liquid crystal display panels depending on whether the electrical wiring 113 and 114 is present. Consequently, the degree of spread of a sealing agent on a plane is greater in the seal 106 formed in a region with a smaller cell gap (i.e., the intersection of the seal 106 and the electrical wiring) than in the seal 106 formed in a region with a greater cell gap (i.e., a section where no electrical wiring is present), resulting in a disorderly pattern of the seal 106.

In particular, in the case of a liquid crystal display device fabricated by the multi-panel technique, i.e., by connecting a plurality of liquid crystal display panels as described above, it is necessary to form a thin pattern of seal 106 with excellent linearity very close to the pixel electrodes 115. Therefore, the oozing sealing agent and the disorderly seal pattern directly cause a serious problem such as the erosion of the pixel regions 120 by the sealing agent.

SUMMARY OF THE INVENTION

In the field of liquid crystal display devices of multi-panel type designed for achieving a large display by connecting a plurality of liquid crystal display panels, it is an object of the present invention to realize more natural display with less noticeable joint of the liquid crystal display panels by forming a thin seal pattern with excellent linearity and uniform cell gaps.

In order to achieve the above object, a liquid crystal display device of the present invention is of multi-panel type including a plurality of liquid crystal display panels connected to each other adjacently on a flat surface, and each of the liquid crystal display panels includes a pair of substrates fastened by seals containing spacers, and a liquid crystal sandwiched between the pair of substrates, wherein a diameter of the spacers contained in the seal placed on the joined side of each liquid crystal display panel and adjacent liquid crystal display panel differs from a diameter of the spacers contained in the seal placed on other sides so that the cell gap on the joined side is substantially equal to the cell gap on the other sides.

This configuration enables the cell gap on the joined side of each liquid crystal display panel and adjacent liquid crystal display panel to be substantially equal to the cell gap on other sides. It is therefore possible to render the cell gaps of each of the liquid crystal display panels uniform and provide a liquid crystal display device showing more natural display with less noticeable joint of the liquid crystal display panels.

In a preferred embodiment of the liquid crystal display device, the diameter of the spacers contained in the seal placed on the joined side of each liquid crystal display panel and adjacent liquid crystal display panel is made greater than the diameter of the spacers contained in the seal placed on other sides.

On sides of each liquid crystal display panel other than the joined side of the liquid crystal display panel and adjacent liquid crystal display panel, there is a possibility that the seal intersects electrical wiring provided for connecting the liquid crystal display panel and, for example, a driver. This configuration prevents the cell gap on the joined side of each liquid crystal display panel and adjacent liquid crystal display panel from becoming smaller than the cell gap on other sides. Consequently, it is possible to render the cell gaps of the liquid crystal display panels uniform and provide a liquid crystal display device showing more natural display with less noticeable joint of the liquid crystal display panels.

In an alternative preferred embodiment of the liquid crystal display device, at least one of the substrates of each liquid crystal display panel includes electrical wiring which is arranged not to overlap the seal placed on the joined side of each liquid crystal display panel and adjacent liquid crystal display panel.

In this configuration, since the electrical wiring and the seal placed on the joined side of each liquid crystal display panel and adjacent liquid crystal display panel do not overlap, it is possible to prevent the seal pattern from oozing out and distraction of the linearity which occur when the electrical wiring and the seal overlap. Consequently, a thin seal pattern can be formed with precision, and the resulting liquid crystal display device of multi-panel type has excellent display quality and less noticeable joint of the liquid crystal display panels.

Moreover, when spherical spacers are contained in the seal placed on the joined side of each liquid crystal display panel and adjacent liquid crystal display panel, the cell gaps are controlled excellently because the spherical spacers overlap each other to a small extent. Thus, the variation in the cell thickness of the liquid crystal display panels can be reduced, and the resulting liquid crystal display device of multi-panel type has excellent display quality and less noticeable joint of the liquid crystal display panels.

Further, when fibrous spacers are contained in the seal placed on the sides other than the joined side of each liquid crystal display panel and adjacent liquid crystal display panel, the fabrication cost can be reduced because the fibrous spacers are usually inexpensive and formed by simply cutting glass fibers. It is thus possible to provide a multi-panel type liquid crystal display device having excellent display quality.

In order to achieve the above object, a method for fabricating a liquid-crystal display device of multi-panel type including a plurality of liquid crystal display panels connected to each other adjacently on a flat surface, includes selecting one drawing head from a plurality of drawing heads filled with sealing agents containing spacers of different diameters, respectively, and applying the sealing agent to predetermined locations on substrates constructing the liquid crystal display panels using the selected drawing head.

In this fabrication method, it is possible to easily apply several types of sealing agents containing spacers of different diameters to desired locations on the substrates. Consequently, it is possible to easily form a liquid crystal display device in which, for example, the diameter of spacers contained in a seal placed on the joined side of each liquid crystal display panel and adjacent liquid crystal display panel differs from the diameter of spacers contained in a seal placed on other sides.

For a fuller understanding of the nature and advantages of the invention, reference should be made to the ensuing detailed description taken in conjunction with the accompanying drawings.

BRIEF DESCRIPTION OF THE DRAWINGS

FIG. 6(a) is a cross section of the liquid crystal display panel cut along the A—A' plane in FIG. 5, and FIG. 6(b) is a cross section of the liquid crystal display panel cut along the B—B' plane in FIG. 4.

FIGS. 7(a) and 7(b) are provided for a comparison purpose with FIGS. 6(a) and 6(b), FIG. 7(a) illustrating a cross section of the liquid crystal display panel cut along the A—A' plane shown in FIG. 5 when a seal is formed by a sealing agent containing spacers having a uniform diameter, FIG. 7(b) illustrating a cross section of the liquid crystal display panel cut along the B—B' plane shown in FIG. 4 in the same conditions as above.

FIG. 9 is a view explaining a spherical spacer and a fibrous spacer contained in sealing agents in a liquid crystal display device according to another embodiment of the present invention.

DESCRIPTION OF THE PREFERRED EMBODIMENTS

Embodiment 1

The following description will discuss one embodiment of the present invention with reference to FIGS. 1 to 8.

Figure 1:
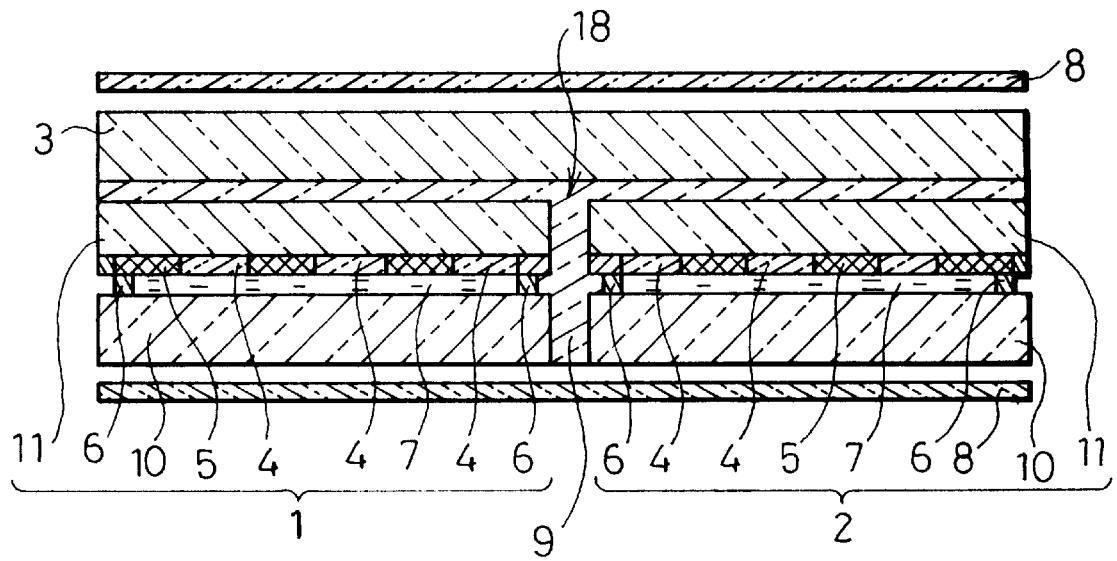
FIG. 1 is a cross section showing the structure of a liquid crystal display device of multi-panel type according to one embodiment of the present invention.

As illustrated in FIG. 1, a liquid crystal display device of this embodiment is constructed by placing two pieces of liquid crystal display panels 1 and 2 on the same surface of a large transparent substrate 3. A refractive index adjusting agent 9, to be explained later, fills the space between the large transparent substrate 3 and the liquid crystal display panels 1 and 2 and the space between the liquid crystal display panel 1 and the liquid crystal display panel 2. The refractive index adjusting agent 9 also functions as an adhesive agent.

The liquid crystal display panels 1 and 2 are constructed by placing a TFT substrate 10 made of a transparent insulating substrate and a counter substrate 11 to face each other, fastening the substrates 10 and 11 with a seal 6, and sealing a liquid crystal in the space between the substrates 10 and 11 to form a liquid crystal layer 7.

Figure 2:
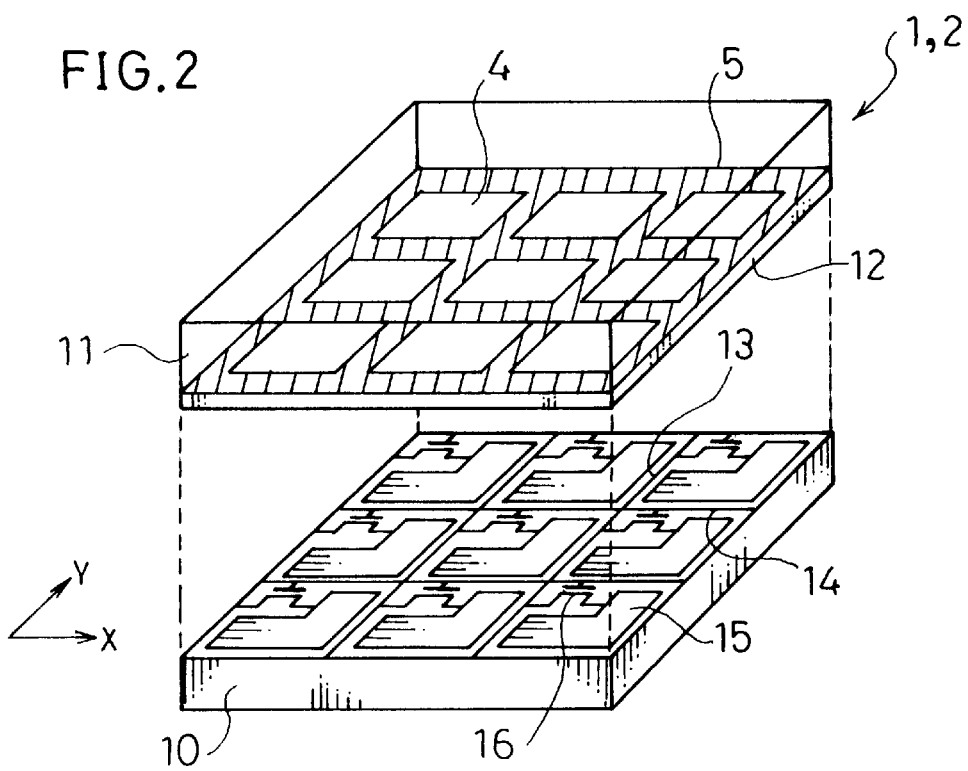
FIG. 2 is a perspective depiction showing the arrangement of electrodes in a part of the liquid crystal display device.

As illustrated in FIG. 2, scanning electrodes 14 and signal electrodes 13 are formed to cross each other at right angles on the TFT substrate 10. In FIG. 2, the longitudinal direction of the scanning electrode 14 is indicated as the X direction, and the longitudinal direction of the signal electrode 13 is indicated as the Y direction. One thin film transistor 16 (hereinafter refereed to as TFT) is disposed at each intersection of the scanning electrode 14 and the signal electrode 13. Moreover, one pixel electrode 15 is disposed in each region enclosed by the scanning electrode 14 and the signal electrode 13. The TFT 16 is a field effect transistor using a semiconductor film, and controls the supply of an image signal to each of the pixel electrodes 15.

On the other hand, disposed on the counter substrate 11 are the common electrode 12, a black matrix 5, and RGB (red, green and blue) color filters 4 corresponding to the respective pixel electrodes 15. The black matrix 5 prevents light from falling on the spaces between the pixel electrodes 15 and the areas of the TFTs 16.

When connecting such liquid crystal display panels 1 and 2, it is necessary to fill the joint (joined line) 18 between the panels 1 and 2 with the refractive index adjusting agent 9. The refractive index adjusting agent 9 prevents diffusion of light due to unevenness between the edges of the liquid crystal panels 1 and 2 at the joint 18, and renders the joint 18 less noticeable.

The refractive index adjusting agent 9 is required to also function as an adhesive agent when fastening the large transparent substrate and the liquid crystal display panels 1 and 2. It is therefore necessary to use a material having adhesive and sticky properties, for example, a ultraviolet-ray-setting resin which is used for fastening optical lenses, as the refractive index adjusting agent.

By placing polarizing plates 8 over the entire front and back surfaces of a large panel which is formed by connecting the above-mentioned two pieces of liquid crystal display panels 1 and 2 with the refractive index adjusting agent 9 so that the polarization axes thereof cross each other at right angles, a liquid crystal display device of multi-panel type is fabricated.

In general, a direct-viewing liquid crystal display device include a backlight such as a cold-cathode lamp. When a liquid crystal display panel placed in front of the backlight modulates light from the backlight according to image information, the image information input to the liquid crystal display panel is observed.

In the liquid crystal display device of this embodiment, as described above, since the polarizing plates 8 are placed so that the polarization axes thereof cross each other at right angles, a leakage of light from the joint 18 between the liquid crystal display panels 1 and 2 shows black in a cross nicol state of the polarizing plates 8, and is therefore less noticeable.

Figure 3:
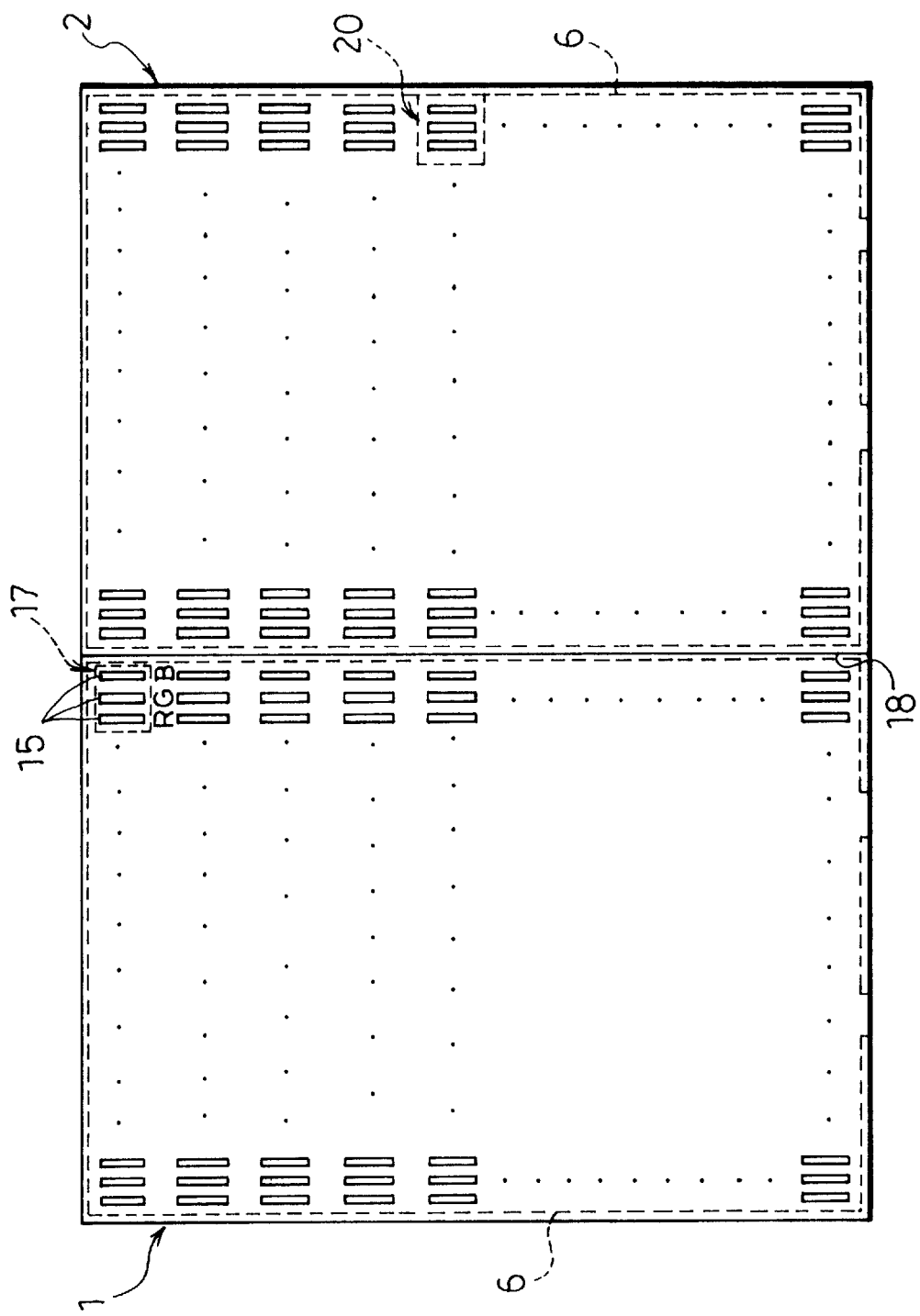
FIG. 3 is a plan view showing the state in which a plurality of liquid crystal display panels constructing the liquid crystal display device are joined.
Figure 4:
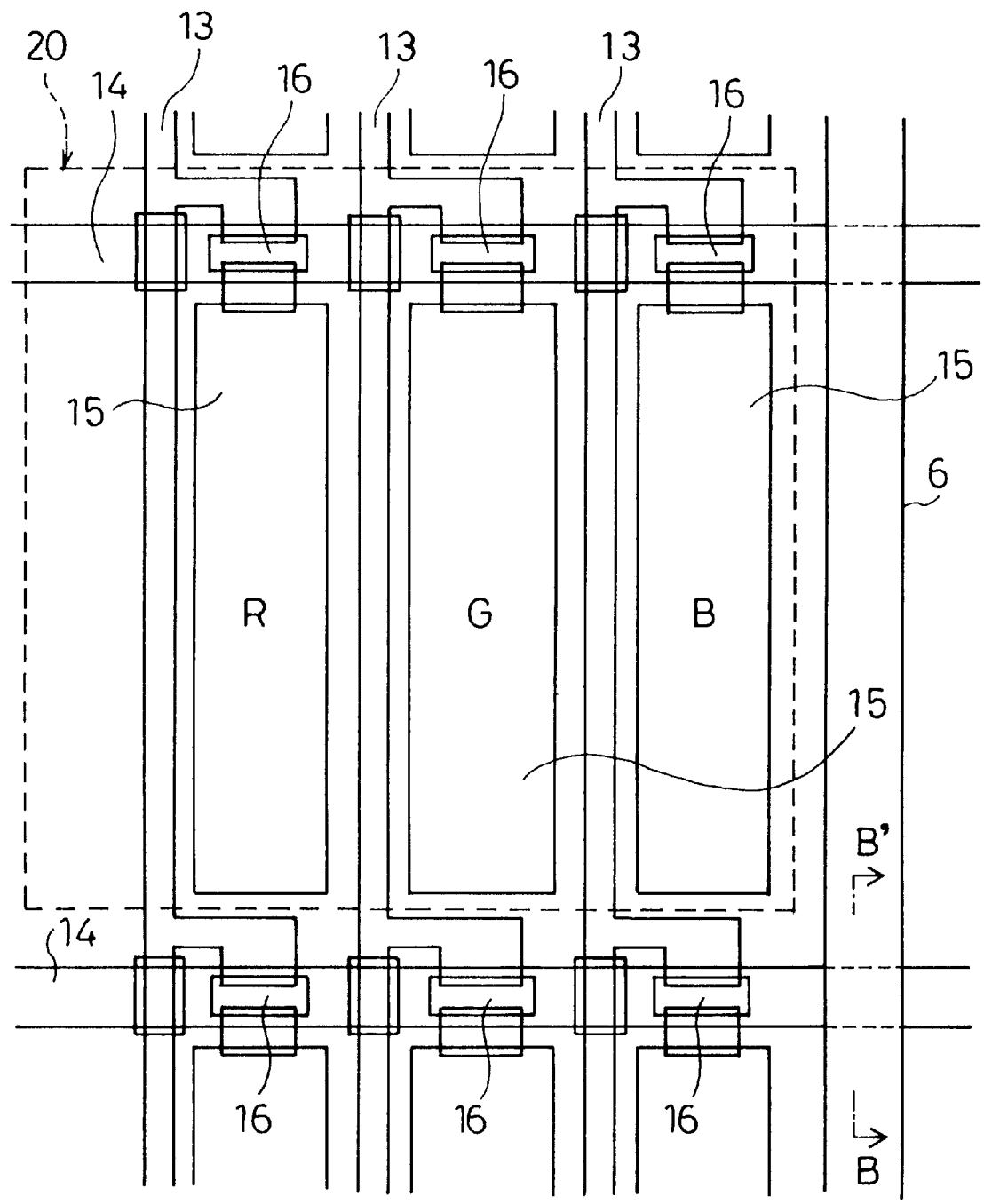
FIG. 4 is an enlarged plan view of the liquid crystal display panels shown in FIG. 3, illustrating a structure in the vicinity of pixel regions which are not adjacent to the joint of the panels.
Figure 5:
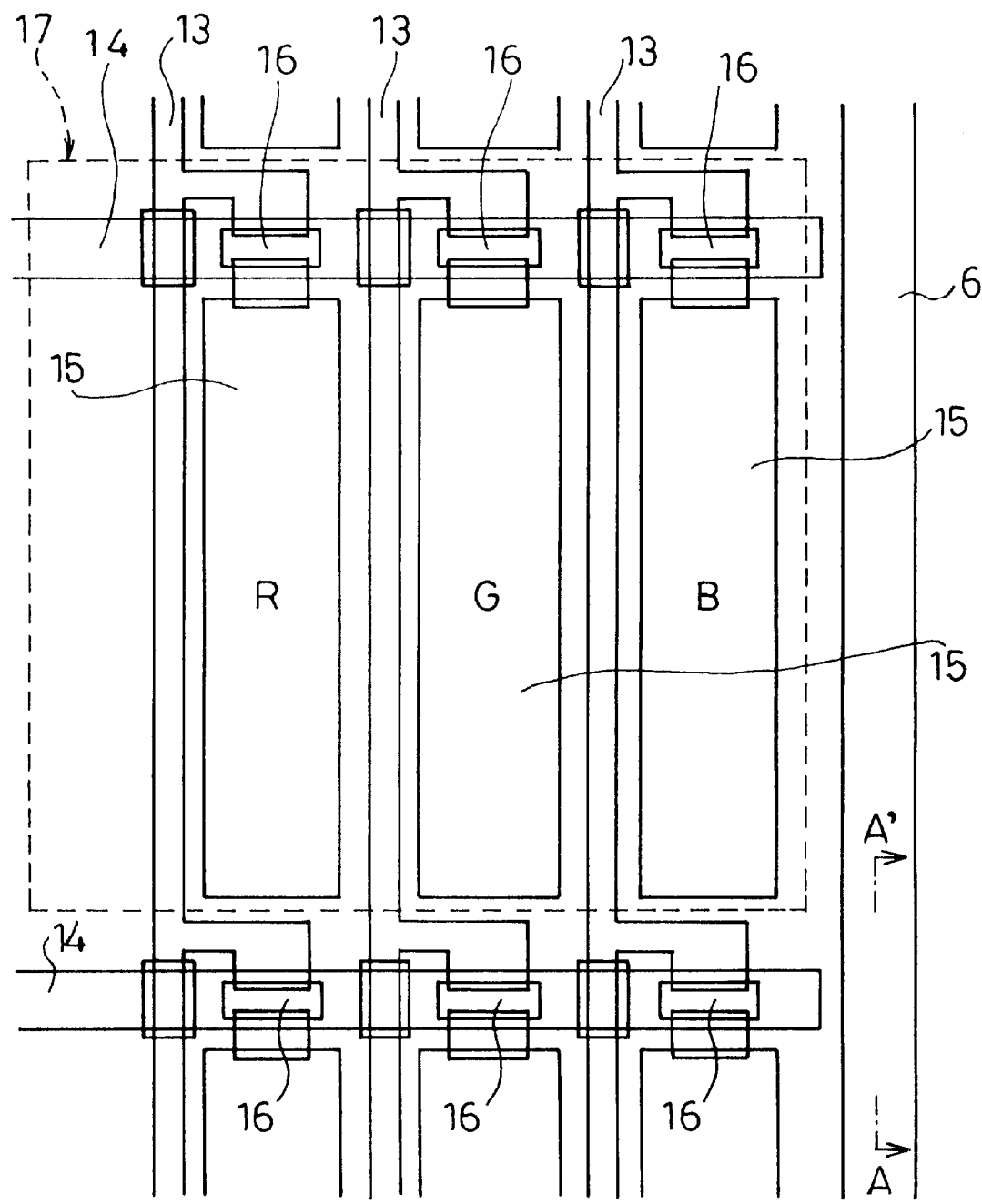
FIG. 5 is an enlarged plan view of the liquid crystal display panel shown in FIG. 3, illustrating a structure in the vicinity of pixel regions adjacent to the joint of the panels.

Referring now to FIGS. 3 to 5, the following description will discuss a structure in the vicinity of the seal 6 on the liquid crystal display panels 1 and 2.

FIG. 3 is a plan view showing the state in which the liquid crystal display panels 1 and 2 are joined. FIG. 4 is an enlarged plan view showing a structure in the vicinity of a pixel region 20 shown in FIG. 3, i.e., a pixel region which is not adjacent to the joint 18 of the liquid crystal display panels 1 and 2. FIG. 5 is an enlarged plan view showing a structure in the vicinity of a pixel region 17 shown in FIG. 3, i.e., a pixel region which is adjacent to the joint 18 of the liquid crystal display panels 1 and 2.

As illustrated in FIG. 5, the liquid crystal display panels 1 and 2 are designed so that the scanning electrodes 14 and the seal 6 do not overlap in the pixel regions adjacent to the joint 18 of the liquid crystal display panels 1 and 2. In this design, there is no unevenness of the ground which causes a sealing agent to ooze out when forming the seal 6, and thus a thin seal pattern having excellent linearity can be formed. In addition, when using an ultraviolet-ray-setting resin as the sealing agent, it is possible to sufficiently irradiate the ultraviolet-ray-setting resin with ultraviolet rays because the ultraviolet rays are not blocked by the scanning electrodes 14.

On the other hand, in pixel regions adjacent to sides other than the joint 18 of the liquid crystal display panels 1 and 2, it is necessary to connect a driver IC for driving the liquid crystal display device and electrical wiring to the scanning electrodes 14. Therefore, the seal 6 and the scanning electrodes 14 are arranged to overlap each other as shown in FIG. 4.

In general, the seal 6 contains spacers for controlling cell gaps. In a prior art, a sealing agent containing spacers having a uniform diameter is used to achieve a uniform cell gap. However, if such a sealing agent containing spacers having a uniform diameter is used in the liquid crystal display device of this embodiment, the following problem arises.

FIGS. 7(*a*) is a cross section of the liquid crystal display panel cut along the A—A' plane shown in FIG. 5 when a seal 6' is formed by a sealing agent containing spacers 129 having a uniform diameter. FIG. 7(*b*) is a cross section of the liquid crystal display panel cut along the B—B' plane shown in FIG. 4 in the same conditions as above. It is clear from the comparison between FIGS. 7(*a*) and 7(*b*) that cell gaps (spaces between the upper and lower substrates) $g_1$ and $g_2$ on a side where the seal 6' is formed vary depending on whether or not the scanning electrodes 14 overlaps the seal 6'. More specifically, since each of the liquid crystal display panels 1 and 2 is formed so that the scanning electrodes 14 and the seal pattern do not overlap each other on a side adjacent to the other liquid crystal display panel 1 or 2, if a sealing agent containing the spacers 129 having a uniform diameter is used, the cell gap $g_1$, located at sections where the seal 6' and the scanning electrodes 14 do not intersect becomes smaller than the cell gap $g_2$ located at the intersections of the scanning electrodes 14 and the seal 6'. As a result, the cell thickness varies, and the joint of the liquid crystal display panels becomes noticeable.

In order to solve this problem, the liquid crystal display panel of this embodiment has the following configuration.

FIG. 6(*a*) is a cross section of the liquid crystal display panel of this embodiment cut along the A—A' plane in FIG. 5, and FIG. 6(*b*) is a cross section of the liquid crystal display panel of this embodiment cut along the B—B' plane in FIG. 4. As illustrated in FIGS. 6(*a*) and 6(*b*), in the configuration of this embodiment, the diameter of a spacer 28 contained in the seal 6 disposed on a side other than the joint 18 of the liquid crystal display panels 1 and 2 differs from the diameter of a spacer 27 contained in the seal 6 disposed on a side adjacent to the joint 18 of the liquid crystal display panels 1 and 2.

Namely, the diameter of the spacer 28 is arranged to be greater than that of the spacer 27. For example, in this embodiment, the seal 6 disposed on the side adjacent to the joint 18 of the liquid crystal display panels 1 and 2 contains spherical spacers of φ 5.0 μm, and the seal 6 disposed on sides other than the side adjacent to the joint 18 contains the spherical spacers 27 of φ 4.5 μm.

In a prior art, when the scanning electrodes and the seal are arranged not to overlap each other, since the scanning electrodes are not present in the seal section, the cell gap in the vicinity of the joint of two pieces of liquid crystal display panels becomes smaller. As a result, the cell thickness varies, and display defects occur. In contrast, in the configuration of this embodiment, as illustrated in FIGS. 6(*a*) and 6(*b*), a cell gap $G_1$ in the vicinity of a side adjacent to the joint 18 of the liquid crystal display panels 1 and 2 can be arranged to be equal to a cell gap $G_2$ in the vicinity of a side other than the side adjacent to the joint 18. It is thus possible to solve the problem associated with the prior art, i.e., display defects in the vicinity of the joint of the two pieces of the liquid crystal display panels caused by the varying cell gap.

Figure 8:
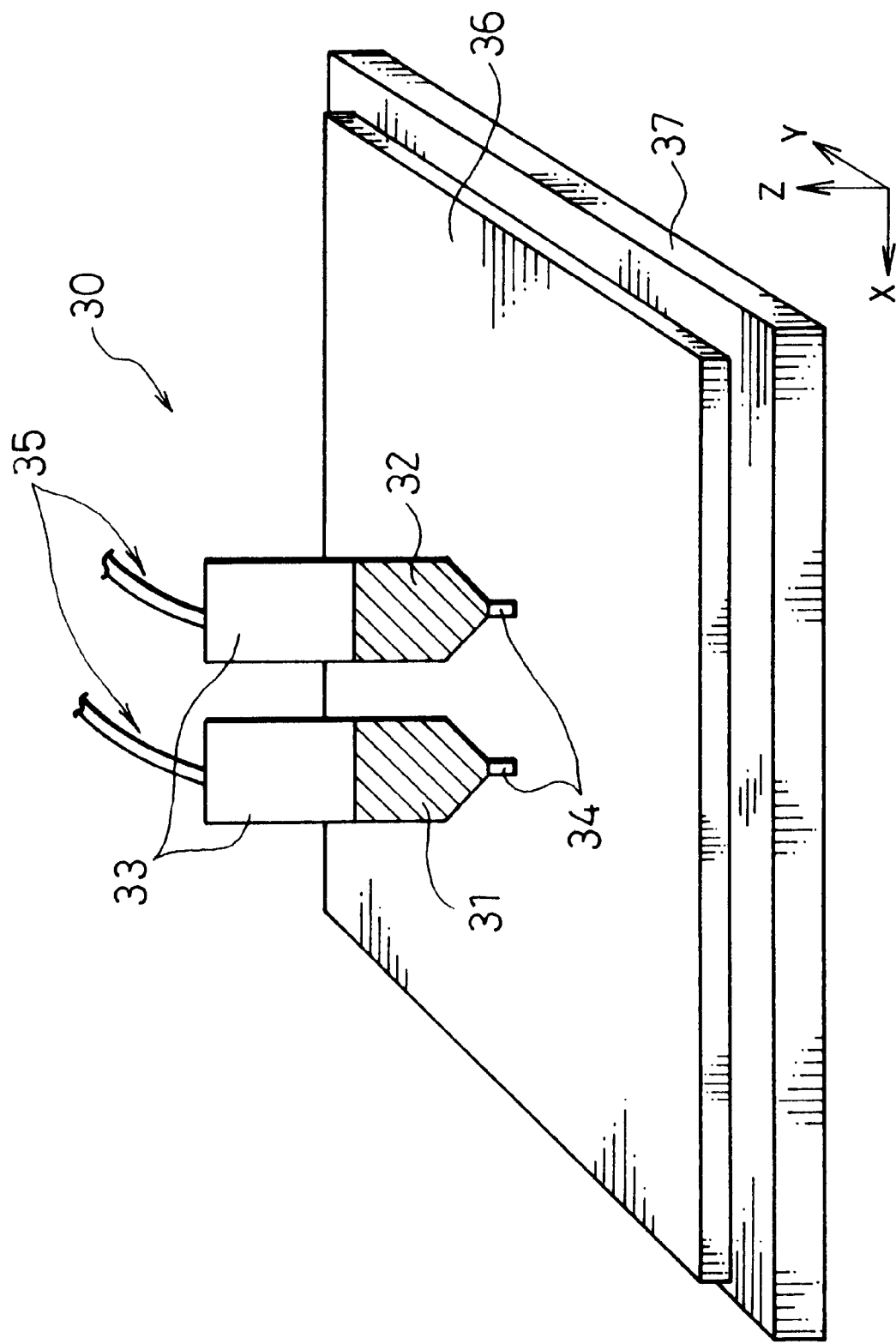
FIG. 8 is a depiction showing how a seal is drawn on a substrate using a dispenser type seal drawing device having a plurality of drawing heads in the process of fabricating the liquid crystal display device.
Figure 10:
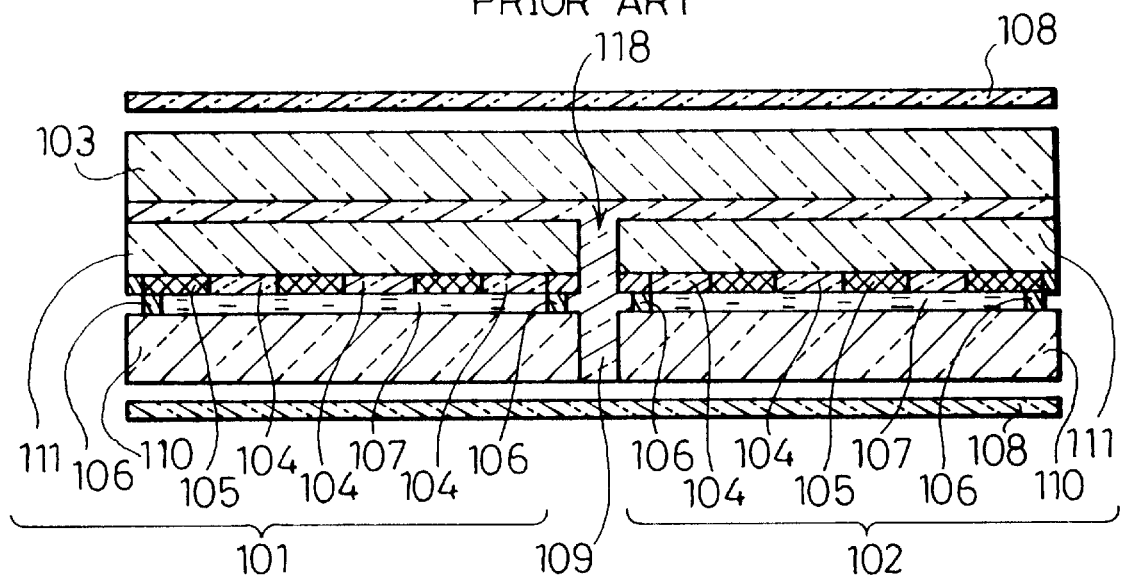
FIG. 10 is a cross section showing one example of the structure of a conventional liquid crystal display device of multi-panel type.
Figure 11:
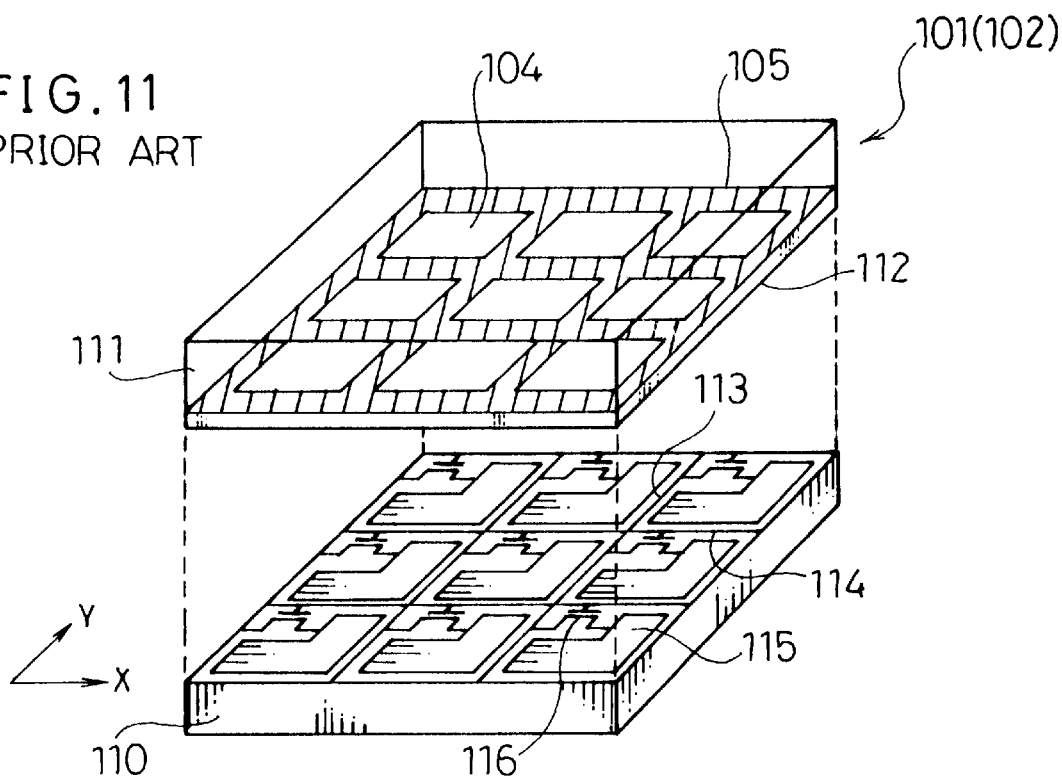
FIG. 11 is a perspective depiction showing the arrangement of electrodes in a part of the conventional liquid crystal display device.
Figure 12:
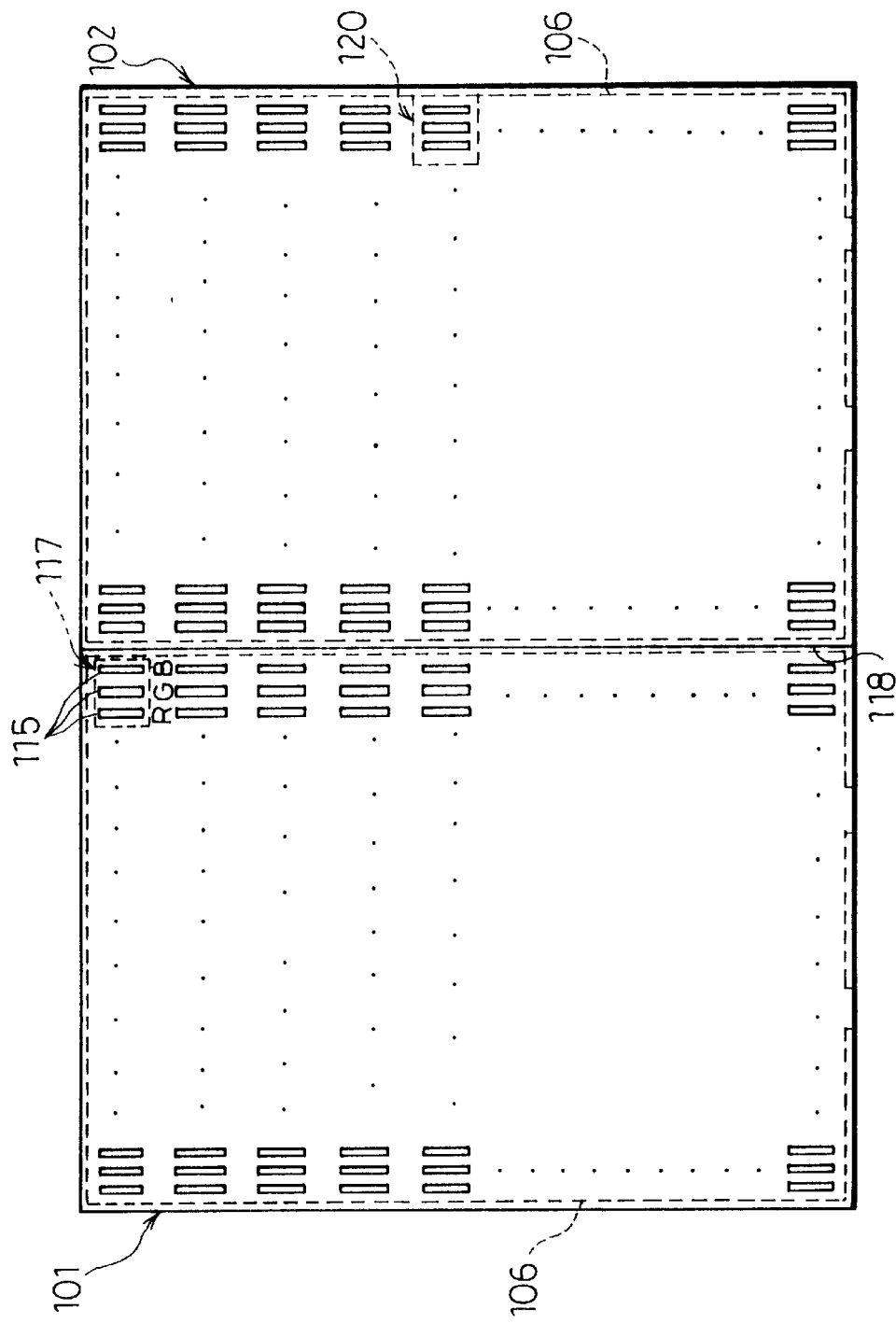
FIG. 12 is a plan view showing the state in which a plurality of liquid crystal display panels constructing the conventional liquid crystal display device are joined.
Figure 13:
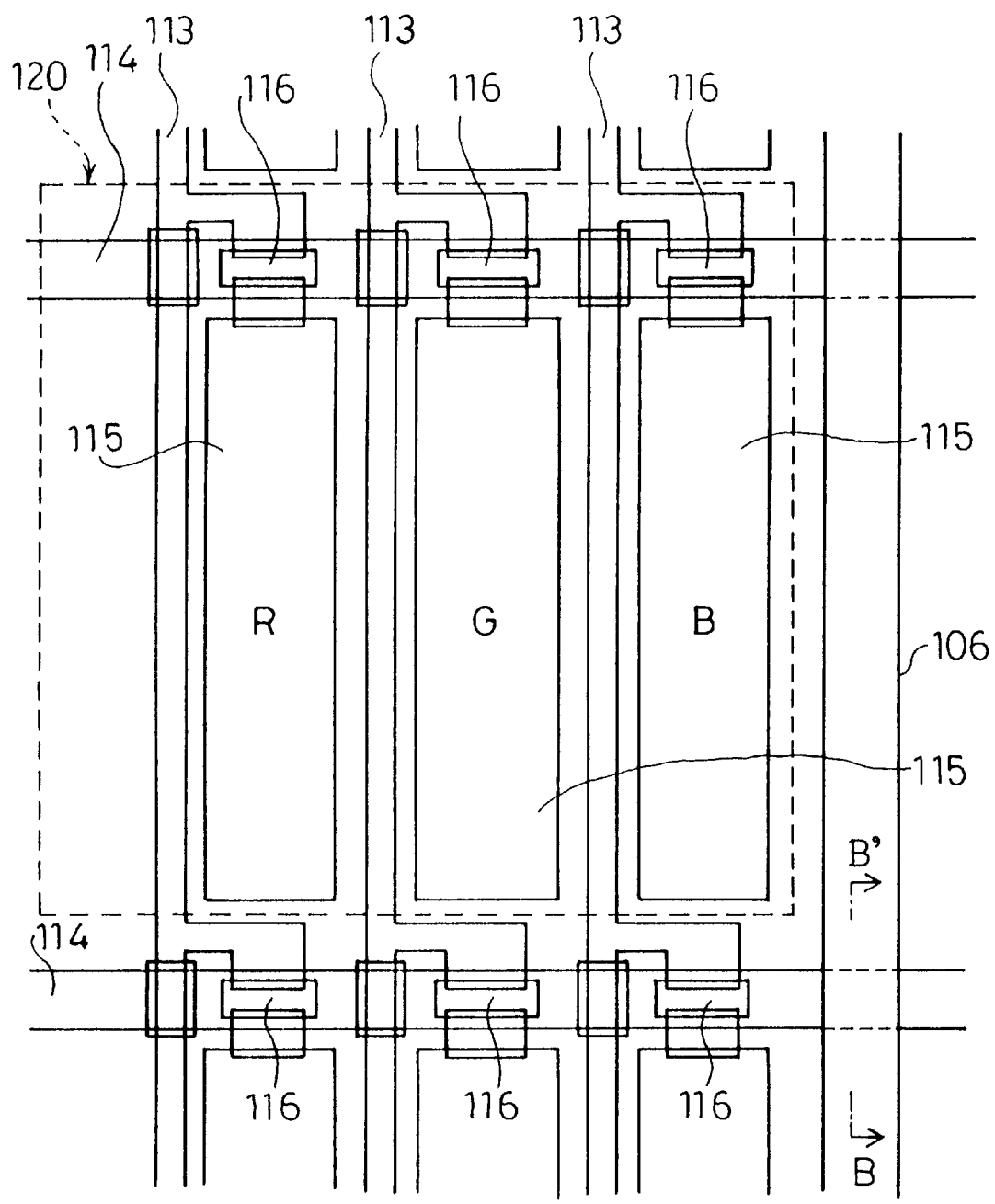
FIG. 13 is an enlarged plan view of the conventional liquid crystal display panel shown in FIG. 12, illustrating a structure in the vicinity of a seal.

In a conventional seal application method using, for example, a screen printing machine, it is impossible to simultaneously apply several types of seals containing spacers with different diameters to a piece of substrate. FIG. 8 is a view explaining how several types of seals containing spacers having different diameters are simultaneously applied to a piece of substrate.

As illustrated in FIG. 8, in this embodiment, a seal drawing device 30 of dispenser type including a plurality of drawing heads 31 and 32 is used. Each of the drawing heads 31 and 32 is formed by a syringe 33 in which a sealing agent to be applied is contained, a nozzle 34 for determining the diameter within which the seal is applied (jet), and an air pressure mechanism 35 for applying air pressure to the sealing agent. A substrate 36 on which a pattern of seal 6 is drawn by the seal drawing device 30 is fixed onto a stage 37 by suction, and is movable in the X and Y directions according to the pattern of seal 6.

Additionally, the drawing heads 31 and 32 are movable in the Z direction to follow the undulation of the substrate 36. It is therefore possible to draw a pattern of seal 6 by always keeping a uniform thickness with respect to a set value.

In this embodiment, a sealing agent containing the spherical spacers 28 of φ 5.0 μm is filled in the syringe 33 of the drawing head 31, while a sealing agent containing the spherical spacers 27 of φ 4.5 μm is filled in the syringe 33 of the drawing head 32. Thereafter, the seal 6 is formed along the side adjacent to the joint of the liquid crystal display panels 1 and 2 by the drawing head 31. Next, the seal 6 is formed along other sides by the drawing head 32. The drawing conditions are shown in Table 1.

TABLE 1

|  | Drawing head 31 | Drawing head 32 |
| --- | --- | --- |
| Sealing agent | Ultraviolet-ray-setting resin (viscosity: 30000 cp) | Ultraviolet-ray-setting resin (viscosity: 30000 cp) |
| Diameter of spacers contained in sealing agent | φ 5.0 μm (spherical) | φ 4.5 μm (spherical) |
| Bore of nozzle | φ 100 μm | φ 200 μm |
| Nozzle-substrate distance (gap) | 10 μm | 20 μm |
| Air pressure | 2.5 kg/cm$^2$ | 5.0 kg/cm$^2$ |
| Stage moving rate | 50 mm/s | 50 mm/s |

Thus, the sealing agents containing two types of spacers having different diameters were formed with high precision on the same substrate. Hence, it is possible to easily fabricate a liquid crystal display device of this embodiment as mentioned above.

As described above, in the configuration of this embodiment, the scanning electrodes 14 and the seal 6 located on the side adjacent to the joint 18 of the liquid crystal display panels 1 and 2 do not overlap each other. On other sides, the scanning electrodes 14 may be arranged to cross the seal 6 so as to connect the scanning electrodes 14 to, for example, a driver. In this case, by arranging the diameter of the spacers 28 contained in the seal 6 positioned on the side adjacent to the joint 18 of the liquid crystal display panels 1 and 2 to be greater than that of the spacers 27 contained in the seal 6 located on other sides, it is possible to prevent the cell gap on the side adjacent to the joint 18 from becoming smaller that the cell gap on the other sides. This arrangement has the effect of preventing display defects from being caused by the varying cell thickness.

Embodiment 2

The following description will discuss another embodiment of the present invention with reference to FIG. 9. The structures having the same function as in Embodiment 1 will be designated by the same code and their description will be omitted.

In general, as spacers contained in a seal, glass spacers with small resilience are used so as to accurately control the cell gaps. As illustrated in FIG. 9, there are two types of glass spacers, spherical spacers 40 and fibrous spacers 41. The characteristics of the spacers 40 and 41 are shown in Table 2.

TABLE 2

|  | Spherical spacers 40 | Fibrous spacers 41 |
| --- | --- | --- |
| Price | High | Low |
| Controllability of cell gap | Excellent | Fair |

As shown in Table 2, since the spherical spacer 40 is formed by spherical crystal of $SiO_2$, it is expensive. On the other hand, since the fibrous spacer 41 is formed by simply cutting glass fiber, it is inexpensive.

Regarding the control of the cell gap, since the spherical spacers 40 overlap each other to a small extent, the spherical spacers 40 excellently control the cell gap. Whereas, since the fibrous spacers 41 tend to overlap each other, the fibrous spacers 41 are slightly inferior to the spherical spacers 40 in terms of the controllability of the cell gap.

In general, the spherical spacers 40 are often used in an STN liquid crystal display panel which requires precise cell gap control because of their superior characteristics. In contrast, inexpensive fibrous spacers 41 are often used in the TN liquid crystal display panel and TFT liquid crystal display panel that require relatively rough cell gap control.

In the liquid crystal display device of Embodiment 1 above, two types of spacers having different diameters are used as spacers contained in the seal 6. In Embodiment 1, both of the spacers are spherical in shape for the reasons below. The dispenser-type seal drawing device 30 used as a seal pattern drawing device draws a seal while keeping the gap between the substrate 36 and the ends of the nozzles 34 of the drawing heads 31 and 32 at a predetermined value within a range of from 10 μm and 30 μm. In this case, if fibrous spacers with a length of several ten micron meters are used, the possibility of clogging the ends of the nozzles 34 with the spacers is high. Therefore, spherical spacers which show a lower possibility of clogging is used in Embodiment 1.

On the other hand, in Embodiment 2, two types of spacers, i.e., the spherical spacers 40 and the fibrous spacers 41, are used. Continuous drawing experiments were executed to exam in the occurrence of clogging of nozzles 34 by containing the spherical spacers 40 and fibrous spacers 41 having a diameter of φ 4.5 μm in the sealing agent used in Embodiment 1 and varying the distance between the nozzles 34 and the substrate 36. The results are shown in Table 3.

TABLE 3

| Distance between nozzles 34 and substrate 36 | Spherical spacers 40 | Fibrous spacers 41 |
| --- | --- | --- |
| 10 μm | ○ | x |
| 15 μm | ○ | x |
| 20 μm | ○ | ○ |
| 25 μm | ○ | ○ |
| 30 μm | ○ | ○ |

○: nozzle 34 was clogged
x: nozzle 34 was not clogged

As is clear from the results of the experiments that it is possible to use the inexpensive fibrous spacers 41 as well as the spherical spacers 40 for the seal 6 formed by using the seal drawing device 30 including drawing heads which are positioned to keep a distance of not less than 20 μm between the nozzles 34 thereof and the substrate 36.

Hence, like Embodiment 1, a seal pattern was formed by filling the drawing head 31 with a sealing agent containing the spherical spacers 40 and filling the drawing head 32 with a sealing agent containing the fibrous spacers 41. As a result, the seal pattern was formed without problems, and an excellent liquid crystal display device was fabricated like Embodiment 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device of multi-panel type including a plurality of liquid crystal display panels connected to each other adjacently on a flat surface, said liquid crystal display panels comprising a pair of substrates fastened by seals containing spacers, and a liquid crystal sandwiched between said pair of substrates, wherein a diameter of the spacers contained in said seal placed on a joined side of each liquid crystal display panel and adjacent liquid crystal display panel differs from a diameter of the spacers contained in said seal placed on other sides so that a cell gap on the joined side is substantially equal to a cell gap on the other side.

2. The liquid crystal display device according to claim 1, wherein a diameter of the spacers contained in said seal placed on a joined side of each liquid crystal display panel and adjacent liquid crystal display panel is greater than a diameter of the spacers contained in said seal placed on other sides.

3. The liquid crystal display device according to claim 1, wherein at least one of said substrates of each liquid crystal display panel includes electrical wiring, and said electrical wiring does not overlap said seal placed on the joined side of each liquid crystal display panel and adjacent liquid crystal display panel.

4. The liquid crystal display device according to claim 1, wherein the spacers contained in said seal placed on the joined side of each liquid crystal display panel and adjacent liquid crystal display panel are spherical.

5. The liquid crystal display device according to claim 4,
wherein the spacers contained in said seal placed on sides other than the joined side of each liquid crystal display panel and adjacent liquid crystal display panel are fibrous.

6. The liquid crystal display device according to claim 1,
wherein said seal is formed by a material including an ultraviolet-ray-setting resin.

7. A method for fabricating a liquid-crystal display device of multi-panel type including a plurality of liquid crystal display panels connected to each other adjacently on a flat surface, comprising forming a seal containing spacer of a desired diameter by selecting one drawing head from a plurality of drawing heads filled with sealing agents containing spacers of different diameters, respectively, and by applying said sealing agents to predetermined locations on substrates constructing said liquid crystal display panels.

8. A method for fabricating a liquid-crystal display device of multi-panel type including a plurality of liquid crystal display panels connected to each other adjacently on a flat surface, comprising applying a sealing agent containing spherical spacers to a location on each liquid crystal display panel along a joined side of each liquid crystal display panel and adjacent liquid crystal display panel and applying a sealing agent containing fibrous spacers to a location on each liquid crystal display panel along other sides using a plurality of drawing heads filled with said sealing agents containing said spherical spacers and fibrous spacers, said spherical spacers and said fibrous spacers having different diameters.

* * * * *